2,957,802

METHANOISOTHIANAPHTHENE DERIVATIVE

Erhard J. Prill, Dayton, Ohio, assignor to Monsanto Chemical Company, St. Louis, Mo., a corporation of Delaware No Drawing. Filed Apr. 21, 1958, Ser. No. 729,505

2 Claims. (Cl. 167—33)

The present invention relates to organic compounds of sulfur and more particularly provides a new methanoisothianaphthene compound, the method of preparing the same, insecticidal compositions comprising the new compound, and methods of destroying insect pests in which said compositions are used.

According to the invention, there is provided 4,5,6,7,8,8 - hexachloro - 3A,4,7,7A - tetrahydro - 4,7 - methanoisothianaphthene by the reaction of hexachlorocyclopentadiene with 2,5-dihydrothiophene substantially according to the scheme

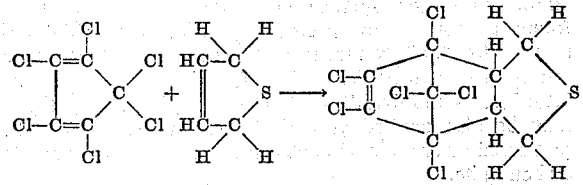

Reaction of the hexachlorocyclopentadiene with the 2,5-dihydrothiophene takes place readily at ordinary, decreased or increased temperature by simply mixing the two reactants and allowing the resulting reaction mixture to stand until formation of the 4,5,6,7,8,8 - hexachloro - 3A,4,7,7A - tetrahydro - 4,7 - methanoisothianaphthene has taken place. Since the reaction is exothermic, application of external heat is generally not required, although in order to complete the reaction within an optimum period it may be desirable to apply heat as the reaction proceeds. Temperatures of from, say, 0° C. to about 140° C. may be used, the operating temperature employed being dependent upon the other reaction conditions employed, e.g., reactant quantities, reaction pressure, speed of stirring, presence or absence of extraneous diluent, etc. Since the reaction takes place by addition of one mole of the hexachlorocyclopentadiene with one mole of the 2,5-dihydrothiophene, these reactants are advantageously used in stoichiometric proportions. However, an excess of either reactant may be used. Conveniently, an excess of the hexachlorocyclopentadiene is employed as a diluent. Extraneous diluents or solvents which may be used are, e.g., carbon tetrachloride, hexane, ether, etc. The 4,5,6,7,8,8-hexachloro-3A,4,7,7A - tetrahydro - 4,7 - methanoisothianaphthene may be recovered from the reaction products by known isolation procedures, e.g., by solvent extraction or distillation. Generally, if the reactants have been used in stoichiometric proportions, the product may be used directly for many purposes, without purification. However, when either an excess of one of the reactants or an extraneous diluent has been employed, it is convenient to isolate the product by sublimation. While catalysts are not necessary for the present reaction to take place, if desired, the process may be carried out catalytically. Use of a hydrogen chloride scavenger may be desirable in that thereby there is absorbed any hydrogen chloride which may be possibly evolved during the reaction as a result of decomposition of either the reactants or the product. It generally suffices for this purpose, to employ in the reaction mixture a small quantity, say, an amount of from 1% to 5% by weight of an inorganic base, e.g., sodium or potassium carbonate or acetate. However, as will be herein disclosed, good results are obtained irrespective of whether or not an alkaline additive is employed.

Either batch or continuous procedures may be used in carrying out the present process, and the operation may be conducted at either atmospheric, super-atmospheric or sub-atmospheric pressures.

The presently provided 4,5,6,7,8,8-hexachloro-3A,4,7, 7A - tetrahydro - 4,7 - methanoisothianaphthene is a stable, waxy solid which is useful for a variety of industrial and agricultural purposes, e.g., as a plasticizer for synthetic resins and plastics, as a lubricant additive, and as a biological toxicant. As will be shown hereinafter, the compound is particularly useful as an insecticide, being effective against insect pests either by contact or residual action when employed in very small concentrations. Because it does not injure plant life at insecticidal concentrations, the present compound is especially valuable as the active ingredient of agricultural insecticide compositions.

The present invention is further illustrated, but not limited, by the following examples:

Example 1

To 164 g. (0.6 mole) of hexachlorocyclopentadiene, which had been heated to 145° C., there was gradually added 43 g. (0.5 mole) of 2,5-dihydrothiophene. During the addition, the temperature of the reaction mixture was maintained at from 140° C. to 150° C. Heating at 150° C. was continued for two hours. The whole was then vacuum distilled to 130° C. in order to remove any unreacted material, and the black residue was taken up in benzene. After treating the resulting solution with charcoal, the solvents were removed and the residue was sublimed at 150° C./0.05 mm. The yellow-white, waxy sublimate was recovered and resublimed (140° C./0.04 mm.) to obtain the substantially pure 4,5,6,7,8,8-hexachloro-3A,4,7,7A - tetrahydro - 4,7 - methanoisothianaphthene, analyzing 8.93% sulfur, as against 8.66%, the calculated value.

Example 2

A mixture of hexachlorocyclopentadiene (164 g., 0.6 mole) and 5 g. of sodium carbonate was heated to 120–125° C., and there was gradually added thereto 43 g. (0.5 mole) of 2,5-dihydrothiophene. The temperature of the reaction mixture rose to about 145° C. during addition of the first half of the dihydrothiophene. Before adding the remainder, the reaction mixture was allowed to cool to 125° C. During addition of the last half of the dihydrothiophene, heating was employed to maintain the temperature at 135° C. The whole was then held at 128–130° C. for 3.5 hours. At the end of that time, an additional 10 g. of sodium carbonate was added and the reaction mixture was allowed to stand overnight at room temperature. Unreacted material was removed by stripping to 140° C./0.3 mm., and the residue was charged to a sublimator. The material which sublimed at 150° C./0.1 mm., was collected and purified by maintaining it on a clay plate in order to remove absorbed oils. There was thus obtained 120 g. of yellow, waxy solid, which upon resublimation gave the substantially pure yellowish white 4,5,6,7,8,8-hexachloro-3A,4,7,7A-tetrahydro-4,7-methanoisothianaphthene.

Example 3

Evaluation of the residual action of the 4,5,6,7,8,8-hexachloro - 3A,4,7,7A - tetrahydro - 4,7 - methanoisothianaphthene against the Southern armyworm, *Prodenia eridania*, was conducted as follows:

Uninfested Wood's prolific lima bean leaves are cut with petioles about 2 to 3 inches long. These were inserted in water-filled test tubes which were plugged with non-absorbent cotton and arranged on a holding block. An emulsion was prepared by placing 0.1 g. of the test compound into a flask, adding about 10 cc. of acetone thereto and 3 drops of an emulsifying agent known to the trade as "Tween 20" (polyalkylene glycol sorbitan monolaureate), and thoroughly mixing the whole. To the mixture there was then added 100 cc. of water to make an 0.1% emulsion of the test compound. The excised bean leaves were then dipped therein and placed on a holding block. "Controls" were prepared by dipping bean leaves into a similarly prepared emulsion which contained none of the test compound. When dried, the leaves were laid on absorbent paper and respectively infested with 10 third instar Southern armyworm. The infested leaves were then stored in the insectary at 77° F. for 48 hours. At the end of that time, observation of the armyworm showed a 100% kill of those which had been placed on the leaves that had been dipped into said emulsion of 4,5,6,7,8,8 - hexachloro - 3A,4,7,7A-tetrahydro-4,7-methanoisothianaphthene, whereas those which had been placed on the "controls" were alive and in excellent condition.

In another test against the Southern armyworm, the 0.1% emulsion prepared above was diluted with water to give respective emulsions containing an 0.05%, an 0.025%, or an 0.013% concentration of the 4,5,6,7,8,8-hexachloro - 3A,4,7,7A - tetrahydro - 4,7 - methanoisothianaphthene. Uninfested pots of beans were respectively sprayed to run with one of said emulsions, and leaves were excised from the dried plants, placed in holding blocks and infested with the armyworm as above. Inspection at the end of the week showed a 100% kill of all of the armyworm which had been deposited on the sprayed and dried leaves.

*Example 4*

Testing of the 4,5,6,7,8,8 - hexachloro - 3A,4,7,7A-tetrahydro - 4,7 - methanoisothianaphthene against the red flour beetle, *Tribolium castaneum* (Hbst.), was conducted as follows:

A 1.0% solution of the test compound was prepared in acetone, and 1 ml. of said solution was respectively pipetted evenly over No. 2 Whatman, 9 cm. filter papers. "Controls" were also prepared by pipetting 1 ml. of acetone on each of two filter papers. The acetone was allowed to evaporate from all of the treated papers and the latter were then stored for 24 hours. At the end of that time, glass rings were set on each paper and 10 red flour beetle adults were placed within the rings. The tests were then held on the laboratory bench for 24 hours. Observation at that time showed 100% kill of all of the beetles that had been deposited on the filter paper which had been treated with the acetone solution of the test compond, whereas in the case of the "controls," there was zero kill of the beetles.

Retesting of the present compound at decreasing concentrations showed that a 100% kill of the *Tribolium castaneum* was obtained at 0.5%, 0.25%, 0.13% and 0.063% concentrations of the 4,5,6,7,8,8 - hexachloro-3A,4,7,7A-tetrahydro-4,7-methanoisothianaphthene.

*Example 5*

This example describes testing of the 4,5,6,7,8,8-hexachloro - 3A,4,7,7A - tetrahydro - 4,7 - methanoisothianaphthene against the yellow fever mosquito, *Aedes aegypti* (Linni). The following procedure was employed:

Culture tubes (rimless 25 x 200 mm.) were respectively filled with 70 cc. of distilled water. A 1.0% acetone solution of the test compound was then respectively pipetted into the culture tubes in quantities calculated to give a 10 p.p.m., 5 p.p.m., 2.5 p.p.m., 1.3 p.p.m. or an 0.63 p.p.m. concentration of the test compound. Each tube was rubber-stopped and shaken vigorously to facilitate complete mixing. "Controls" were also prepared by adding the same quantity of acetone (but no test compound) to tubes containing 70 cc. of distilled water, respectively. To each tube there was then added approximately 25 larvae of the test mosquito, and the test solutions with their larvae content were allowed to stand for 24 hours at room temperature. Observation of the tubes of larvae at the end of that time showed a 100% kill of larvae in all of the tubes which contained the 4,5,6,7,8,8 - hexachloro - 3A,4,7,7A - tetrahydro - 4,7-methanoisothianaphthene, and no kill of larvae in the "controls."

The 4,5,6,7,8,8 - hexachloro - 3A,4,7,7A - tetrahydro-4,7-methanoisothianaphthene is an effective toxicant for the control of a wide variety of insects, and may suitably be used as an agricultural chemical for the control of insects on growing crops, generally. Only very low concentrations of the present compound is needed to produce insecticidal effect, e.g., from 0.0005% to 1.0%, depending upon the severity of the infection and the insect species. For the convenient application of these low quantities, suitably the effective ingredient is applied in an inert carrier. Oil-in-water emulsions of the compound obtained by preparing an emulsified concentrate thereof and then diluting with water are highly suitable compositions for application to crops and have been found to possess unexpectedly superior insecticidal activity. By "oil" is meant any organic liquid which is immiscible with water. The 4,5,6,7,8,8 - hexachloro-3A,4,7,7A - tetrahydro - 4,7 - methanoisothianaphthene may be also applied as a dust, i.e., in admixture with powdered or granulated inert carriers such as talc, pumice or bentonite.

What I claim is:

1. 4,5,6,7,8,8 - hexachloro - 3A,4,7,7A - tetrahydro-4,7-methanoisothianaphthene of the structure

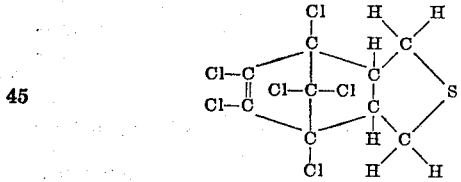

2. The method of destroying insect pests which comprises applying to said insects an insecticidal quantity of 4,5,6,7,8,8 - hexachloro - 3A,4,7,7A - tetrahydro - 4,7-methanoisothianaphthene of the structure

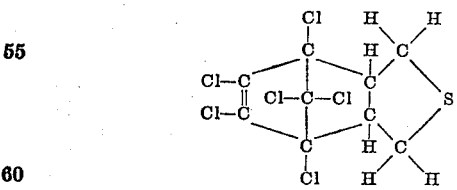

References Cited in the file of this patent

UNITED STATES PATENTS 2,639,286      Mavity      May 19, 1953

FOREIGN PATENTS 1,026,325      Germany      Mar. 20, 1958

OTHER REFERENCES

Conant: The Chemistry of Organic Compounds, Macmillan, New York, 1939, page 264.

W. C. Ward et al.: J. Bacteriology, vol. 56, pp. 649–52 (1948).